W. DÜCHTING.
STABILIZING DEVICE FOR FLYING MACHINES.
APPLICATION FILED DEC. 12, 1910.
1,028,336.  Patented June 4, 1912.
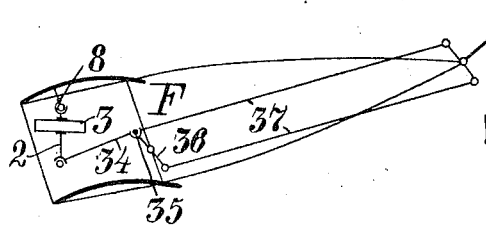
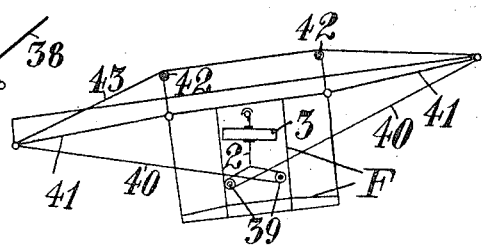
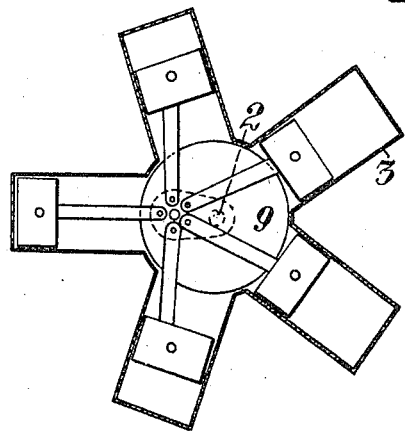
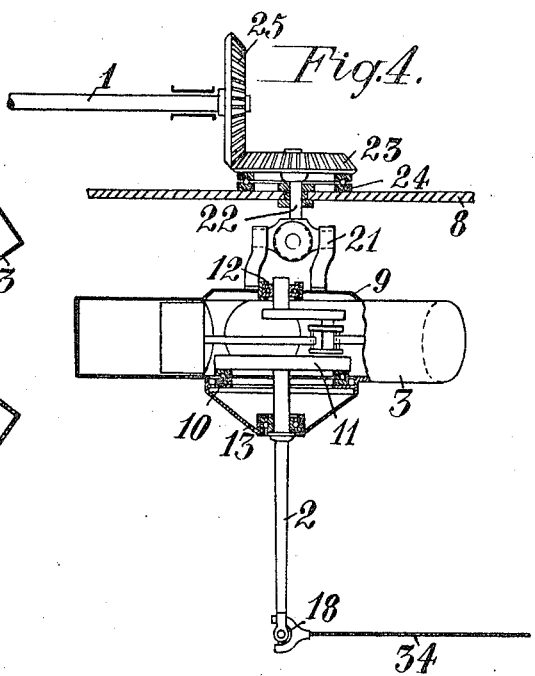

UNITED STATES PATENT OFFICE.

WILHELM DÜCHTING, OF BERLIN, GERMANY, ASSIGNOR TO PAUL RATH, MAJOR, OF KRAKAU, GERMANY.

STABILIZING DEVICE FOR FLYING-MACHINES.

1,028,336.      Specification of Letters Patent.      Patented June 4, 1912.

Application filed December 12, 1910. Serial No. 596,921.

*To all whom it may concern:*

Be it known that I, WILHELM DÜCHTING, engineer, a subject of the German Emperor, and residing at Berlin, Germany, have invented certain new and useful Improvements in Stabilizing Devices for Flying-Machines, of which the following is a specification.

The present invention relates to an arrangement by means of which all kinds of flying machines, monoplanes, and the like may be automatically returned into the normal position both longitudinally and transversely, when such flying machine may have swayed from such normal position. For obtaining this object the driving motor having the form of a rotary engine with a non-rotating crank shaft has been employed as a gyroscope, and the gyrating motor body has been suspended by universal couplings from the framework of the flying machine, whereby, as with other gyroscopic balancing devices, the relative displacement of the motor, to the body of the flying machine, when the latter sways unintendedly, is utilized to return the flying machine body into its normal position by means of stabilizing planes, steering planes, bearing planes, hinged wings or the like.

In the accompanying drawing the present invention is exemplified as employed on a monoplane.

Figure 1 is a diagrammatical view of a monoplane fitted with the arrangement for automatic balancing. Fig. 2 is a rear view of a monoplane with transverse balancing arrangement. Fig. 3 is a horizontal section through the motor. Fig. 4 shows the arrangement of the motor, partly in sectional view.

For driving the propeller shaft 1 of the monoplane a rotary engine is employed, which in the present instance has a number of working cylinders arranged in the shape of a star and combined to one integral body 3 rotating around the vertical non-rotating crank shaft 2. This motor is suspended by means of a universal coupling or the like from the frame F of the flying machine, Figs. 1 and 2, and is maintained by the gyroscopic effect of the rotating motor bodies 3 or a mass rotated by the motor in its position, whatever the displacement of the body of the flying machine may be.

The motor body is suspended by means of a universal joint 21, Fig. 4, or the like from a vertical spindle 22, which has a loose running fit in the motor suspension plate 8 or in a bearing therein. On the upper end of this spindle 22 is fitted a bevel gear 23, which preferably runs with a ball bearing 24 on the said suspension plate 8, and engages with a bevel gear 25 fitted to the end of the propeller shaft 1. The trunnion spindle 21 of the universal joint arranged at the lower end of spindle 22 lies above the center of gravity of the motor. The crank shaft bears with a solid flange 11 on its lower part, on a ball bearing 10 in the motor body 3 and furthermore runs in ball bearings 12 and 13. With this method of suspending the motor the crank shaft must be prevented from rotating without impairing the relative displacement of the flying machine body to the crank shaft 2. This relative displacement of flying machine body and crank shaft to each other is utilized for adjusting specially provided stabilizing planes or already existing steering planes in such a manner, that they will return the flying machine body, which has been displaced from its normal position back into the latter.

For stabilizing the flying machine in a longitudinal direction the crank shaft, Fig. 1, may be coupled with a connecting rod 34, the other end of which is coupled by means of a ball and socket joint 35 or the like with a lever 36 fitted to the body of the flying machine, which lever is coupled with wire pulls 37 or the like to the horizontal rudder 38 at the rear end of the flying machine body. As soon as the part of the flying machine to which said horizontal rudder is fitted rises, as shown in Fig. 1, the rudder 38 will be inclined by means of the connecting rod 34, the lever 36 and the wires 37, so that the wind pressure against the rudder will return the body of the flying machine into its normal position.

For obtaining a stabilizing effect in a transverse direction, the crank shaft 2, Fig. 2, is coupled by means of wires 40 running over guide pulleys, or the like with the stabilizing planes 41 or bearing planes (according to Wright) or hinged wings attached to the same (according to Blériot, Curtis, Farman and others). If the body of the flying machine inclines toward the one side, say the left side, as shown in Fig. 2, the left stabilizing plane 41, bearing plane, hinged plane or the like will be moved downward or warped, whereby simultaneously a wire 43 running over pulleys 42 will turn the plane correspondingly provided at the other side of the flying machine, upward or warp it in the opposite direction. Both planes, which are thus adjusted or warped will under the pressure of the wind return the flying machine body into its initial normal position. When the horizontal rudder 38 is employed as stabilizing plane according to the present invention, the connecting rod 34 is disengageably coupled to the crank shaft 2.

I claim:

1. Stabilizing gyroscope for flying machines, consisting of the driving motor arranged as a rotary engine gyrating around the non-rotating crank shaft, the said driving motor suspended by means of a universal coupling from the frame work of the flying machine.

2. Stabilizing gyroscope for flying machines, consisting of the driving motor arranged as a rotary engine, the body of said engine suspended by means of a universal coupling from the frame-work of the flying machine, the crank shaft of said motor prevented from rotating by suitable means.

In testimony whereof, I affix my signature in the presence of two witnesses.

WILHELM DÜCHTING.

Witnesses:
 HENRY HASPER,
 WOLDEMAR HAUPT.